United States Patent [19]

Inoue et al.

[11] Patent Number: 4,589,996
[45] Date of Patent: May 20, 1986

[54] LIQUID CRYSTALLINE CARBONIC ACID ESTERS AND LIQUID CRYSTAL COMPOSITIONS CONTAINING THE SAME

[75] Inventors: Hiromichi Inoue; Shinichi Saito; Kanetsugu Terashima; Takashi Inukai, all of Yokohamashi; Kenji Furukawa, Yokosukashi, all of Japan

[73] Assignee: Chisso Corporation, Osaka, Japan

[21] Appl. No.: 645,097

[22] Filed: Aug. 28, 1984

[30] Foreign Application Priority Data

Sep. 5, 1983 [JP] Japan .................. 58-162766

[51] Int. Cl.$^4$ .............. C09K 3/34; C09K 19/20; G02F 1/13; C07C 69/96; C07C 68/02
[52] U.S. Cl. .............. 252/299.65; 252/299.5; 252/299.67; 558/273; 350/350 R; 350/350 S
[58] Field of Search ............ 260/463; 252/299.67, 252/299.65, 299.5; 350/350 R, 350 S

[56] References Cited

U.S. PATENT DOCUMENTS

| | | | |
|---|---|---|---|
| Re. 31,715 | 10/1984 | Coates et al. .................. | 252/299.65 |
| 4,065,489 | 12/1977 | Steinstrasser et al. ......... | 252/299.65 |
| 4,149,413 | 4/1979 | Gray et al. .................... | 252/299.64 |
| 4,195,916 | 4/1980 | Coates et al. .................. | 252/299.01 |
| 4,257,911 | 3/1981 | Gray et al. .................... | 252/299.65 |
| 4,264,148 | 4/1981 | Gobl-Wunsch et al. ...... | 252/299.01 |
| 4,405,209 | 9/1983 | Funada et al. ................. | 252/299.4 |

FOREIGN PATENT DOCUMENTS

| | | | |
|---|---|---|---|
| 110299 | 6/1984 | European Pat. Off. ....... | 252/299.67 |
| 115693 | 8/1984 | European Pat. Off. ....... | 252/299.67 |
| 53-88677 | 8/1978 | Japan ............................ | 252/299.67 |
| 57-135883 | 8/1982 | Japan ............................ | 252/299.67 |
| 58-29877 | 2/1983 | Japan ............................ | 252/299.67 |

OTHER PUBLICATIONS

Goodby, J. W. et al., Liq. Cryst. and Ordered Fluids, vol. 4, pp. 1-32, Plenum Press, N.Y. (1984), presented at ACS Symposium held Mar. 29-Apr. 1, 1982, Las Vegas, Nev.
Gray, G. W. et al., Mol. Cryst. Liq. Cryst. vol. 37, pp. 157-188, (1976).
Gray, G. W. et al., Mol. Cryst. Liq. Cryst., vol. 37, pp. 189-211 (1976).
Klanderman, B. H. et al., JACS, vol. 97, No. 6, pp. 1585-1586, (1975).
Gray, G. W. et al., Mol. Cryst. Liq. Cryst., vol. 34, (Letters), pp. 211-217 (1977).
Castellano, J. A. et al., Mol. Cryst. Liq. Cryst., vol. 12, pp. 345-366, (1971).

*Primary Examiner*—Teddy S. Gron
*Attorney, Agent, or Firm*—Fred Philpitt

[57] ABSTRACT

A novel chiral liquid crystalline compound having an optically active group and a liquid crystal composition containing the same are provided, which compound is expressed by the general formula

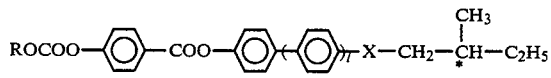

wherein R is a linear chain or branched alkyl group of 1~18 C; l is 0 or 1; X is COO or —O— in the case of l=0 and COO, —O— or —CH$_2$— in the case of l=1; and * represents optically active carbon, and which compound, when used as a display element, brings about a higher response velocity.

7 Claims, No Drawings

LIQUID CRYSTALLINE CARBONIC ACID ESTERS AND LIQUID CRYSTAL COMPOSITIONS CONTAINING THE SAME

BACKGROUND OF THE INVENTION

1. Field of the Invention

This invention relates to new liquid crystalline substances and liquid crystal compositions containing the same, and more particularly it relates to chiral liquid crystalline substances having an optically active group and chiral liquid crystal compositions containing the same.

2. Description of the Prior Art

Twisted nematic (TN) type display mode has currently been most widely employed as liquid crystal display elements, but it is inferior in the response rate as compared with emissive type display elements such as electroluminescence, plasma display, etc., and various attempts for overcoming this drawback have been made, but, nevertheless, it seems that its improvement to a large extent has not been left behind. Thus, various liquid crystal display equipments based on different principles in place of TN type display elements have been attempted, and as one of them, there is a display mode utilizing ferroelectric liquid crystals (N.A. Clark and S.T. Lagerwall, Applied Phys. Lett., 36,899 (1980)). This mode utilizes the chiral smectic C phase (hereinafter abbreviated to SC* phase) or chiral smectic H phase (hereinafter abbreviated to SH* phase) of ferroelectric liquid crystals, and these phases are preferred to be in the vicinity of room temperature. The present inventors have made various searches for liquid crystal substances containing an optically active group, mainly in order to develop liquid crystal substances suitable for being used for the above display mode, and as a result have attained the present invention.

SUMMARY OF THE INVENTION

The present invention resides in a carbonic acid ester expressed by the general formula

wherein R represents a linear chain or branched alkyl group of 1 to 18 carbon atoms; l represents 0 or 1; X represents COO or —O— in the case of l=0 and COO, —O— or —$CH_2$— in the case of l=1; and * represents optically active carbon, and a liquid crystal composition containing the above ester.

DESCRIPTION OF THE PREFERRED EMBODIMENTS

Compounds of the formula (I) wherein l=1 exhibit a SC* phase suitable for liquid crystal display mode utilizing ferroelectric properties in a broad temperature range. Further since the compounds are superior in the compatibility with compounds exhibiting other SC* or SH* phase, compounds exhibiting a cholesteric phase or the like compounds, it is possible to mix the compounds with the latter compounds to thereby use them for broadening the temperature range of the compounds exhibiting a SC* phase.

Further, among the compounds of the formula (I) wherein l=0 are often found compounds which do not form any smectic liquid crystal, which, however, are useful as a component constituting a chiral smectic liquid crystal composition as the so-called chiral liquid crystalline substance.

Table 1 shows the phase transition points of main compounds of those of the formula (I) of the present invention.

TABLE 1

| | In formula (I) | | | Phase transition temperature (°C.) | | | | |
|---|---|---|---|---|---|---|---|---|
| Example | R | l | X | C | | SC* | SA | Ch | I |
| 2 | $C_3H_7$ | 0 | —O— | . | 62.0 | — | — | — | . |
| 3 | $C_5H_{11}$ | 0 | —O— | . | 51.3 | — | — | — | . |
| 4 | $C_7H_{15}$ | 0 | —O— | . | 58.3 | — | — | — | . |
| 5 | $C_8H_{17}$ | 0 | —O— | . | 64.6 | — | — | — | . |
| 1 | $C_9H_{19}$ | 0 | —O— | . | 56.7 | — | — | — | . |
| 7 | $C_3H_7$ | 0 | COO | . | 44.5 | — | — | — | . |
| 8 | $C_7H_{15}$ | 0 | COO | . | 38.1 | — | — | — | . |
| 9 | $C_8H_{17}$ | 0 | COO | . | 40.1 | — | — | — | . |
| 6 | $C_9H_{19}$ | 0 | COO | . | 43.0 | — | (. 41.6) | — | . |
| 11 | $C_3H_7$ | 1 | —$CH_2$— | . | 96.0 | (. 73.3) | — | . 168.4 | . |
| 12 | $C_5H_{11}$ | 1 | —$CH_2$— | . | 58.2 | . 69.6 | — | . 149.6 | . |
| 13 | $C_7H_{15}$ | 1 | —$CH_2$— | . | 51.3 | . 80.7 | — | . 137.2 | . |
| 14 | $C_8H_{17}$ | 1 | —$CH_2$— | . | 63.8 | . 95.5 | — | . 143.2 | . |
| 10 | $C_9H_{19}$ | 1 | —$CH_2$— | . | 75.0 | . 105.3 | — | . 143.4 | . |
| 16 | $C_7H_{15}$ | 1 | —O— | . | 69.5 | . 91.8 | — | . 162.8 | . |
| 17 | $C_8H_{17}$ | 1 | —O— | . | 64.9 | . 96.8 | — | . 159.0 | . |
| 15 | $C_9H_{19}$ | 1 | —O— | . | 71.8 | . 106.5 | — | . 157.7 | . |
| 19 | $C_3H_7$ | 1 | COO | . | 131.0 | . 135.2 | — | . 185.2 | . |
| 20 | $C_5H_{11}$ | 1 | COO | . | 78.0 | . 134.5 | — | . 168.6 | . |
| 21 | $C_7H_{15}$ | 1 | COO | . | 99.8 | . 140.6 | — | . 160.6 | . |
| 22 | $C_8H_{17}$ | 1 | COO | . | 90.5 | . 143.5 | — | . 157.6 | . |
| 18 | $C_9H_{19}$ | 1 | COO | . | 86.0 | . 111.0 | . 145.8 | . 155.3 | . |

In the above Table, C represents a crystalline phase; SA, a smectic A phase; I, an isotropic liquid phase; Ch, a cholesteric phase; and the symbol · in the column of the respective phases and the numeral figures on the right side thereof represent a phase transition temperature from the phases to those on the right side thereof; the symbol -represents that the phases are not exhibited; and the symbol (-) represent a monotropic transition point.

When chiral smectic liquid crystal compositions are composed using the compounds of the formula (I), it is possible to form them from a plurality of compounds of the formula (I), alone, and it is also possible to prepare liquid crystalline compositions exhibiting SC* phase, by mixing compounds of the formula (I) with other smectic liquid crystals.

When the light switching effect of the SC* phase is applied to display elements, the resulting display elements have the following three superior specific features:

The first specific feature is that the elements reply at a very high rate and the response times are 1/100 or less of those of display elements according to the usual TN display mode.

The second specific feature is that the elements have memory effect; hence multiplex drive is easy in combination of this effect with the above-mentioned high rate response properties.

The third specific feature is that gray scale in TN display mode is attained by controlling the impressed voltage applied to display elements, but this is accompanied with difficult problems of the temperature dependency of threshold voltage value and the voltage dependency of response rate. However, in the case where the light switching effect of SC* phase is applied to the display elements, it is possible to easily attain the gray scale by controlling the switching time of polarity; hence the display elements are very suitable for graphic display.

As for the display modes, the following two may be considered:

one mode is of birefringence type using two pieces of polarizers and another is of guest-host type using dichroic dyestuffs. Since SC* phase has a spontaneous polarization, molecules reverse around the helical axis thereof as a revolving axis by reversing the polarity of impressed voltage. A liquid crystal composition having SC* phase is filled into a liquid crystal display cell subjected to an aligning treatment so that liquid crystal molecules can align in parallel to the surface of electrodes, followed by placing the liquid crystal cell between two pieces of polarizers arranged so that the director of the liquid crystal molecules can be in parallel to the polarization plane on another side, impressing a voltage and reversing the polarity to be thereby able to obtain a bright field and a dark field (determined by the opposed angles of polarizers). On the other hand, in the case where display elements are operated in guest-host mode, it is possible to obtain bright field and colored field (determined by the arrangement of polarization sheets) by reversing the polarity of impressed voltage. In general, it is difficult to align liquid crystal molecules in smectic state in parallel to the wall surface of glass; hence liquid crystal molecules have been aligned by cooling them very slowly (e.g. 1~2° C./hr) initially starting from their isotropic liquid, in a magnetic field of several tens Kilogauss or more, but in the case of liquid crystal substances having cholesteric phase, the substances are cooled at a cooling rate of 1° C./min. under impression of a direct current voltage of 50 to 100 V in place of magnetic field, whereby it is possible to easily obtain a monodomain state where liquid crystal molecules are uniformly aligned.

Compounds of the formula (I) also have an optically active carbon atom; hence when they are added to nematic liquid crystals, they have a performance of having a twisted structure induced in the mixtures. Nematic Liquid crystals having a twisted structure, i.e. chiral nematic liquid crystals, do not form the so-called reverse domain of TN type display elements; hence it is possible to use the compounds of the formula (I) as an agent for preventing the reverse domain.

As to the racemi form compounds corresponding to the optically active form compounds of the formula (I), when 2-methyl-1-butanol of racemic form is used as raw material in place of S(—)-2-methyl-1-butanol in the preparation of an optically active form compound mentioned below, then the racemic form compound is similarly prepared, and exhibits almost the same phase transition point as that of (I). Racemic form compounds exhibit a SC phase in place of a SC* phase, and when they are added to the optically active compounds of the formula (I), they are usable for controlling the chiral smectic pitch thereof.

The compounds of the formula (I) of the present invention may be prepared through the following steps:

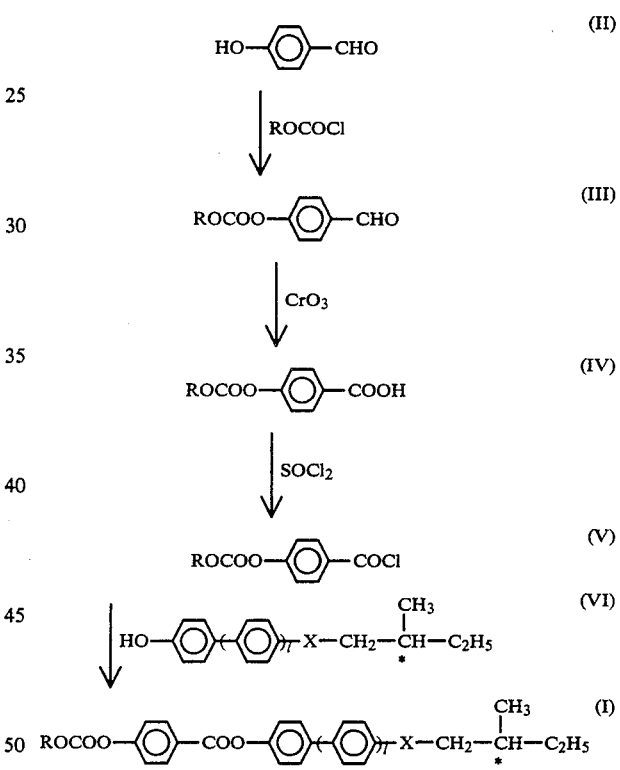

Namely, a known substance, 4-hydroxybenzaldehyde (II) is reacted with an alkyl chloroformate in the presence of pyridine to obtain a compound (III), on which an oxidizing agent such as $Cr_2O_3$ is acted in acetic acid solvent to obtain a compound (IV), which is then reacted with thionyl chloride to obtain a compound (V), which is then reacted with a phenol of the formula (VI) having an optically active group, corresponding to the ultimate objective compound, in the presence of pyridine to obtain the objective compound of the formula (I). The preparation of the compound of the formula (VI) will be described in the following Example.

The liquid crystal compounds and liquid crystal compositions will be described in more details by way of Examples.

EXAMPLE 1

Preparation of 4-nonyloxycarbonyloxybenzoic acid-4'-(S-2-methylbutyloxy)phenyl ester (a compound of the formula (I) wherein R=$C_9H_{19}$, l=0 and X=-O-)

(A) Preparation of 4-nonyloxycarbonyloxybenzoic acid chloride

Nonyl chloroformate (24.7 g, 0.119 mol) was added to a solution of 4-hydroxybenzaldehyde (16 g, 0.131 mol) dissolved in dry pyridine (100 ml), to react them together, followed by sufficiently stirring, allowing the reaction liquid to stand over night, adding toluene (100 ml) and water (100 ml), washing with 6N-hydrochloric acid and then with 2N-NaOH solution and further washing with water till the washing water became neutral and distilling off toluene to obtain 4-nonyloxycarbonyloxyaldehyde as residue (33.2 g). This 4-nonyloxycarbonyloxyaldehyde (20.5 g, 0.070 mol) was dissolved in acetic acid (60 ml). To the solution under agitation was dropwise added a solution of $Cr_2O_3$ (14 g, 0.140 mol) dissolved in water (11 ml) and acetic acid (17 ml) so as to keep the temperature of the system at 30° C. or lower, followed by keeping the inner temperature at 40° C. on a water bath for 4 hours, thereafter cooling, adding water (300 ml), filtering deposited crystals, washing the crystals with water and recrystallizing from ethanol to obtain 4-nonyloxycarbonyloxybenzoic acid (7g). M.P.: 118.3°~120.4° C.

To this 4-nonyloxycarbonyloxbenzoic acid (7 g, 0.023 mol) was added thionyl chloride (6 g, 0.050 mol), followed by heating under reflux for one hour and distilling off excess thionyl chloride to obtain 4-nonyloxycarbonyloxybenzoic acid chloride (7.5 g).

(B) Preparation of hydroquinonemono(S-2-methylbutyl) ether

First, optically active p-toluenesulfonic acid-2-methylbutyl ester is prepared in a conventional manner, that is, by reacting p-toluenesulfonic acid chloride with S(−)-2-methyl-1-butanol in pyridine.

Next, hydroquinone (248 g, 2.252 mols) and KOH (88 g, 1.571 mol) are dissolved in water (30 ml) and ethanol (2 l), and to the solution is added the above p-toluenesulfonic acid chloride-2-methylbutyl ester (366 g, 1.510 mol), followed by heating the mixture with stirring for 2 hours, and further for 7 hours under reflux, distilling off ethanol (1.7 l) and adding water (1.9 l) and 6N-hydrochloric acid for acidification to separate a brown oily product, which was then extracted with heptane (150 ml), followed by three times washing the heptane layer with water (500 ml), distilling off the solvent and distilling the residue under reduced pressure to obtain a fraction having a boiling point of 115°~135° C./2.5 mmHg (176 g), which was then dissolved in heptane (300 ml), followed by extracting the solution with 1N-NaOH aqueous solution (1 l) with stirring, washing the extraction liquid with heptane (100 ml), adding 6N-hydrochloric acid to the alkaline aqueous layer for acidification, washing the resulting separated oily product with water, and distilling the oily product under reduced pressure to obtain a fraction having a boiling point of 107°~111° C./2 mmHg (140 g), which was then dissolved in hexane (200 ml). The solution was kept at 0° C. to deposit crystals. Thus, hydroquinonemono(S-2-methylbutyl) ether (m.p. 41°~42° C.) (129 g) was obtained.

(C) Esterification

Hydroquinonemono(S-2-methylbutyl) ether prepared in (B) (1.4 g, 0.008 mol) was dissolved in pyridine (5 ml), and to the solution was added 4-nonyloxycarbonyloxybenzoic acid chloride prepared in (A) (2.2 g, 0.007 mol) to react them together, followed by sufficiently stirring, allowing the reaction liquid to stand over night, adding toluene (50 ml) and water (50 ml), extracting with stirring, transferring into a separating funnel, washing the organic layer with 6N-hydrochloric acid and then with 2N NaOH aqueous solution, further washing with water till the washing liquid became neutral, distilling off toluene, recrystallizing the residue from methanol at 0° C. and filtering to obtain the objective 4-nonyloxycarbonyloxybenzoic acid-4'-(S-2-methylbutyloxy)-phenyl ester (1 g). This compound exhibted no liquid crystal phase and had a melting point of 56.7° C. The values of elemental analysis of the product accorded well with the calculated values as follows:

|   | Observed values | Calculated values (in terms of $C_{28}H_{38}O_6$) |
| --- | --- | --- |
| C | 71.4% | 71.46% |
| H | 8.1% | 8.14% |

EXAMPLES 2~5

Example 1 was repeated except that nonyl chloroformate of (A) of Example 1 was replaced by other alkyl chloroformates to obtain compounds of the formula (I) wherein l=0 and X =—O—. The melting points thereof are shown in Examples 2~5 of Table 1 together with the results of Example 1.

Example 6

Preparation of 4-nonyloxycarbonyloxybenzoic acid-4'-(S-2-methylbutyloxycarbonyl)phenyl ester (a compound of the formula (I) wherein R=$C_9H_{19}$, l=0 and X=COO)

(A) Preparation of 4-hydroxybenzoic acid(S-2-methylbutyl) ester

Concentrated sulfuric acid (10 ml) was carefully added to agitated 4-hydroxybenzoic acid (209 g, 1.513 mol), S(−)-2-methyl-1-butanol (200 g, 2.269 mols) and benzene (500 ml), followed by heating under reflux with stirring for 17 hours (amount of water dehydrated: 30 ml), cooling, adding water (100 ml) and toluene (600 ml), extracting with stirring, transferring into a separating funnel, washing the resulting organic layer with 5% $Na_2CO_3$ aqueous solution, further washing with saturated NaCl aqueous solution, placing anhydrous $Na_2SO_4$ (100 g) therein for drying, filtering, distilling off the solvent under reduced pressure and further distilling off excess S(−)-2-methyl-1-butanol to obtain 4-hydroxybenzoic acid(S-2-methylbutyl) ester (316 g).

(B) Esterification

4-Hydroxybenzoic acid(S-2-methylbutyl) ester prepared in (A) (1.7 g, 0.008 mol) was dissolved in pyridine (5 ml), and to the solution was added 4-nonyloxycarbonyloxybenzoic acid chloride (2.2 g, 0.007 mol) to react them together, followed by sufficiently stirring, allowing to stand over night, adding toluene (50 ml) and water (50 ml), extracting with stirring, transferring into a separating funnel, washing the resulting organic layer with 6N-hydrochloric acid and then with 2N-NaOH aqueous solution and further washing with water till the washing liquid became neutral, distilling off toluene, recrystallizing the residue from methanol and filtering to obtain the objective 4-nonyloxycarbonyloxybenzoic acid-4'-(S-2-methylbutyloxycarbonyl)phenyl ester (0.9 g). This product was a monotropic, smectic A liquid crystal having a C-I point of 43.0° C. and an I→SA point of 41.6° C. Further, the values of elemental analysis of this compound accorded well with the calculated values as follows:

|   | Observed values | Calculated values (in terms of $C_{29}H_{28}O_7$) |
| --- | --- | --- |
| C | 69.3% | 69.85% |
| H | 7.2% | 7.68% |

EXAMPLES 7~9

Compounds of the formula (I) wherein R=other alkyl groups, l=0 and X=COO were prepared in the same manner as in Example 6. The melting points of these compounds are shown in Examples 7~9 of Table 1 together with the results of Example 6.

EXAMPLE 10

Preparation of p-nonyloxycarbonyloxybenzoic acid-4-(S-3-methylpentyl)-4'-biphenylyl ester (a compound of the formula (I) wherein R=$C_9H_{19}$, l=1 and X=—$CH_2$—)

(A) Preparation of 4-(S-3-methylpentyl)-4'-hydroxybiphenyl (First step)

Sliced magnesium (12.4 g, 0.510 mol) and dry ether (50 ml) were introduced into a three-neck flask under dry nitrogen atmosphere, and to the mixture agitated was dropwise added a solution of (+) brominated-2-methylbutyl (prepared by reacting S(—)-2-methyl-1-butanol with phosphorus bromide) dissolved in dry ether (1 l) so as to keep the temperature of the system at 25° C.

After completion of the dropwise addition, the mixture was kept at room temperature for 30 minutes, followed by dropwise adding a solution of commercially available 4-octyloxy-4'-cyanobiphenyl (129 g, 0.420 mol) dissolved in dry ether (1 l) so as to keep the temperature of the system at 10° C. or less, heating under reflux for 4 hours, pouring the reaction liquid into water (600 ml), further adding dilute sulfuric acid (conc. sulfuric acid (40 ml) and water (800 ml)), adding toluene (500 ml), extracting with stirring, washing the toluene layer with water till the washing liquid became neutral, distilling off the solvent, distilling the residue under reduced pressure to collect a fraction having a boiling point of 245°~255° C./ 4 mmHg and recrystallizing from acetone (30 ml) to obtain 4-octyloxy-4'-(S-3-methylpentanoyl)biphenyl (24.6 g). This product exhibited a smectic liquid crystal phase and had a C-SA point of 70.4° C., a SA-I point of 98.3° C. and an I→SC* point of 68.3° C.

(Second step)

Into a 500 ml three-neck flask were introduced 4-octyloxy-4'-(S-3-methylpentanoyl)biphenyl obtained above (24.6 g, 0.065 mol), 80% hydrazine hydrate (50 ml) and diethylene glycol (85 ml), heating with stirring, keeping at 120° C. for one hour, cooling, adding to the reaction liquid kept at 50° C., a solution of KOH (8.8 g, 0.157 mol) dissolved in water (5 ml), at a stroke, distilling off water, etc. so as to keep the temperature of the system at 200° C., reacting at 200° C. for 4 hours, cooling, adding water (200 ml) and toluene (50 ml), transferring into a separating funnel, washing the resulting organic layer with water till the washing liquid became neutral, distilling off the solvent, distilling the residue under reduced pressure, collecting a fraction having a boiling point of 210°~213° C./3 mmHg and recrystallizing it from a mixed solvent of ethyl alcohol (20 ml) and ethyl acetate (5 ml) to obtain 4-octyloxy-4'-(S-3-methylpentyl)biphenyl (13.5 g). This product also was a smectic liquid crystal and had a C-$S_1$ point of 43.0° C., a $S_1$-SH* point of 57.9° C., a SH*-SC* point of 62.5° C. and a SC*-I point of 65.1° C. ($S_1$ referred to herein is an unidentified smectic phase.)

(Third step)

Into a 500 ml three-neck flask were introduced 4-octyloxy-4'-(S-3-methylpentyl)biphenyl obtained above (13.5 g, 0.037 mol), acetic acid (120 ml) and 47% hydrobromic acid (15 ml), followed by refluxing with stirring, for 40 hours, cooling, adding water (150 ml) and toluene (50 ml), transferring into a separating funnel, washing with water till the washing liquid became neutral, distilling off the solvent and recrystallizing from heptane to obtain 4-(S-3-methylpentyl)-4'-hydroxybiphenyl (6.5 g). M.P.: 120.7°~122.6° C.

(B) Esterification

To a solution of 4-(S-3-methylpentyl)-4'-hydroxybiphenyl obtained in (A) (2.0 g, 0.008 mol) dissolved in pyridine (5 ml) was added 4-nonyloxycarbonyloxybenzoic acid chloride prepared in (A) of Example 1 (2.2 g, 0.007 mol) to react them together, followed by sufficiently stirring, allowing to stand over night, adding toluene (10 ml) and water (10 ml), transferring into a separating funnel, washing the resulting organic layer with 6N-hydrochloric acid and then with 2N-NaOH solution, further washing with water till the washing liquid became neutral, distilling off toluene and recrystallizing the residue from methanol to obtain the objective p-nonyloxycarbonyloxybenzoic acid-4-(S-3-methylpentyl)-4'-biphenylyl ester (1.0 g). This product was a smectic and cholesteric liquid crystal and had a C-SC* point of 75.0° C., a SC*-Ch point of 105.3° C. and a Ch-I point of 143.4° C. Further the values of elemental analysis of this product accorded well with the calculated values as follows:

|   | Observed values | Calculated values (in terms of $C_{35}H_{44}O_5$) |
| --- | --- | --- |
| C | 77.1% | 77.17% |
| H | 8.1% | 8.14% |

EXAMPLES 11~14

Compounds of the formula (I) wherein R=other alkyl groups, l=1 and X=—$CH_2$— were obtained in the same manner as in Example 10. The phase transition points of these compounds are shown in Examples 11~14 of Table 1 together with the results of Example 10.

EXAMPLE 15

Preparation of p-nonyloxycarbonyloxybenzoic acid-4-(S-2-methylbutyloxy)-4'-biphenylyl ester (a compound of the formula (I) wherein $R=C_9H_{19}$, $l=1$ and $X=-O-$)

(A) Preparation of 4-(S-2-methylbutyloxy)-4'-hydroxybiphenyl

A mixture of 4,4'-dihydroxybiphenyl (500 g), ethanol (7.5 l) and KOH (302 g) was heated under reflux with stirring, and (+) brominated-2-methylbutyl (prepared by reacting S(−)-2-methyl-1-butanol with phosphorus bromide) (530 g) was dropwise added to react them together for 4 hours, followed by distilling off ethanol, adding water (2 l), filtering, collecting an insoluble matter, adding toluene to the insoluble matter to remove a soluble matter, which was then recrystallized from ethanol to give scaly crystals having a melting point of 80.5° C. (This material was confirmed to be 4,4'-di(S-2-methylbutyloxy)biphenyl.) The resulting insoluble part was heated together with 3N-hydrochloric acid, with stirring, followed by cooling, collecting a solid product and recrystallizing the product from toluene and then from ethanol to obtain 4-(S-2-methylbutyloxy)-4'-hydroxybiphenyl having a melting point of 137.5° C. (125 g).

(B) Esterification 4-(S-2-methylbutyloxy)-4'-hydroxybiphenyl obtained above (2 g) was dissolved in pyridine (5 ml), and to the solution was added 4-nonyloxycarbonyloxybenzoic acid chloride (2.2 g) to react them together, followed by sufficiently stirring, allowing to stand over night, adding toluene (50 ml) and water (50 ml), extracting with stirring transferring into a separating funnel, washing the resulting organic layer with 6N-hydrochloric acid and then with 2N-NaOH solution, further washing with water till the washing liquid became neutral, distilling off toluene and recrystallizing the residue from methanol to obtain the objective p-nonyloxycarbonyloxybenzoic acid-4-(S-2-methylbutyloxy)-4'-biphenylyl ester (1.1 g). This product had a C-SC* point of 71.8° C., a SC*-Ch point of 106.5° C. and a Ch-I point of 157.7° C. Further, the values of elemental analysis of this compound accorded well with the calculated values as follows:

|   | Observed values | Calculated values (in terms of $C_{34}H_{42}O_6$) |
| --- | --- | --- |
| C | 74.6% | 74.69% |
| H | 7.7% | 7.75% |

EXAMPLES 16 and 17

Compounds of the formula (I) wherein R=other alkyl groups, $l=1$ and $X=-O-$ were prepared in the same manner as in Example 15. The phase transition points of these compounds are shown in Examples 16 and 17 of Table 1 together with the results of Example 15.

Example 18

Preparation of p-nonyloxycarbonyloxybenzoic acid-4-(S-2-methylbutyloxycarbonyl)-4'-biphenylyl ester (a compound of the formula (I) wherein $R=C_9H_{19}$, $l=1$ and $X=COO$)

(A) Preparation of 4-hydroxy-4'-biphenylcarboxylic acid-(S-2-methylbutyl) ester

Conc. sulfuric acid (2 ml) was added to agitated 4-hydroxy-4'-biphenylcarboxylic acid (20 g), S(−)-2-methyl-1-butanol (30 g) and benzene (50 ml), followed by heating under reflux with stirring for 17 hours, cooling, adding water (50 ml) and toluene (100 ml), extracting with stirring, washing the resulting organic layer with 5% $Na_2CO_3$ aqueous solution, then washing with saturated NaCl aqueous solution, distilling off the solvent and recrystallizing the residue from a mixed solvent of benzene and heptane to obtain 4-hydroxy-4'-biphenylcarboxylic acid (S-2-methylbutyl) ester (7 g). M.P.: 114.2°~115.6° C.

(B) Esterification

4-Hydroxy-4'-biphenylcarboxylic acid(S-2-methylbutyl) ester obtained above (2.3 g) was dissolved in pyridine (5 ml), and to the solution was added 4-nonyloxycarbonylbenzoic acid chloride (2.2 g) to react them together, followed by sufficiently stirring, allowing to stand over night, adding toluene (50 ml) and water (50 ml), extracting with stirring, transferring into a separating funnel, washing the resulting organic layer with 6N-hydrochloric acid and then with 2N-NaOH aqueous solution, further washing with water till the washing liquid became neutral, distilling off toluene and recrystallizing the residue from methanol to obtain the objective p-nonyloxycarbonyloxybenzoic acid-4-(S-2-methylbutyloxycarbonyl)-4'-biphenylyl ester (0.8 g). This product had a C-SC* point of 86.0° C., a SC*-Ch point of 111.0° C. and a Ch-I point of 155.3° C. Further the values of elemental analysis of this compound accorded well with the calculated values as follows:

|   | Observed values | Calculated values (in terms of $C_{35}H_{42}O_7$) |
| --- | --- | --- |
| C | 73.1% | 73.14% |
| H | 7.3% | 7.37% |

EXAMPLES 19~22

Compounds of the formula (I) wherein R=other alkyl groups, $l=1$ and $X=COO$ were obtained in the same manner as in Example 18. The phase transition points of these compounds are shown in Examples 19~22 of Table 1 together with the results of Example 18.

Example 23 (Use example 1)

A nematic liquid crystal composition consisting of

| | |
| --- | --- |
| 4-ethyl-4'-cyanobiphenyl | 20% by weight, |
| 4-pentyl-4'-cyanobiphenyl | 40% by weight, |
| 4-octyloxy-4'-cyanobiphenyl | 25% by weight, and |
| 4-pentyl-4'-cyanoterphenyl | 15% by weight, | was filed in a cell (distance between electrodes: 10 μm) consisting of transparent electrodes having polyvinyl alcohol (PVA) applied thereonto and having the surface subjected to parallel alignment treatment by rubbing to prepare a TN type display cell, which was observed under a polarizing microscope. As a result, it was observed that a reverse domain was formed.

To the above nematic liquid crystal composition was added the compound of Example 5 of the present invention (a compound of the formula (I) wherein l=0, X=—O— and R=C$_8$H$_{17}$) in an amount of 1% by weight. A TN cell similarly prepared using the blend was observed. As a result the reverse domain was dissolved to form a uniform nematic phase.

Example 24 (Use example 2)

A blend was prepared from three kinds of compounds of the formula (I) wherein l=1, X=—CH$_2$— and R=C$_5$H$_{11}$ (Example 12), C$_7$H$_{15}$ (Example 13) or C$_8$H$_{17}$ (Example 14), each 30% by weight, and two kinds of compounds of the formula (I) wherein l=1, X=COO and R=C$_5$H$_{11}$ (Example 20) or C$_8$H$_{17}$ (Example 22), each 5% by weight. The blend exhibited a SC* phase up to 87° C. and a Ch phase at higher temperatures and directly formed an isotropic liquid at 145° C. without passing through a SA phase.

This blend was filled in a cell provided with transparent electrodes subjected to a parallel alignment treatment by rubbing its surface, and the cell was gradually cooled till the SC* phase was formed starting from the isotropic liquid range, while a direct current voltage of 50 V was impressed, to obtain a uniform monodomain cell. This liquid crystal cell was placed between two polarizers arranged in a crossed Nicol state, and when an alternating voltage of 15 V having a low frequency (0.5 Hz) was impressed to the cell, a clear switching operation was observed and a liquid crystal display element having a good contrast and a high response velocity (2 m sec.) was obtained.

The value of spontaneous polarization Ps of this liquid crystal composition was 2.9 nC/cm$^2$.

Example 25 (Use example 3)

A blend was prepared from three kinds of compounds of the formula (I) wherein l=1, X=—O— and R-C$_7$H$_{15}$ (Example 16), C$_8$H$_{17}$ (Example 17) or C$_9$H$_{19}$ (Example 15), in amounts of 30, 20 and 20% by weight, respectively, and two kinds of compounds of the formula (I) wherein l=0, X=COO and R=C$_3$H$_7$ (Example 7) or C$_9$H$_{19}$ (Example 6), each 15% by weight. This blend exhibited a SC* phase up to 82° C. and a Ch phase at higher temperatures and directly formed an isotropic liquid at 125° C. without passing through a SA phase.

An anthraquinone dyestuff D-16 (made by BDH Company) was added in an amount of 3% by weight to the above blend to prepare the so-called guest-host type composition. It was filled in a cell same as in Example 24 and one sheet of a polarizer was arranged so that its polarization plane might be perpendicular to the axis of molecule. When an alternating voltage of 15 V having a low frequency of 0.5 Hz was impressed to the cell, a clear switching operation was observed and a color liquid crystal display element having a very good contrast and a high response velocity (2 m sec.) was obtained.

The value of spontaneous polarization of this liquid crystal composition was 3.8 nC/cm$^2$.

What we claim is:

1. A carbonic acid ester expressed by the formula

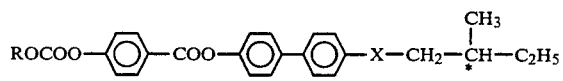

wherein R represents a linear chain or branched alkyl group of 1 to 18 carbon atoms; X represents COO, —O— or —CH$_2$; and * represents optically active carbon.

2. A chiral smectic liquid crystalline composition comprising at least two components, one of which is a carbonic acid ester as set forth in claim 1 and another of which is a smectic C liquid crystal.

3. A chiral smectic liquid crystal composition consisting only of a plurality of the carbonic acid esters set forth in claim 1.

4. A chiral smectic liquid crystal composition consisting of at least one carbonic acid ester as set forth in claim 1 and at least one compound having the formula

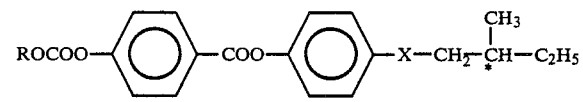

wherein R represents a linear chain or branched alkyl group of 1 to 18 carbon atoms; X represents COO or —O—; and * represents optically active carbon.

5. A light switching element that includes a chiral smectic liquid crystal composition as set forth in claim 2.

6. A light switching element that includes a chiral smectic liquid crystal composition as set forth in claim 3.

7. A light switching element that includes a chiral smectic liquid crystal composition as set forth in claim 4.

* * * * *